Nov. 15, 1966   W. H. JENS   3,285,825
REINFORCED CERAMIC FUEL ELEMENTS
Filed Sept. 16, 1964
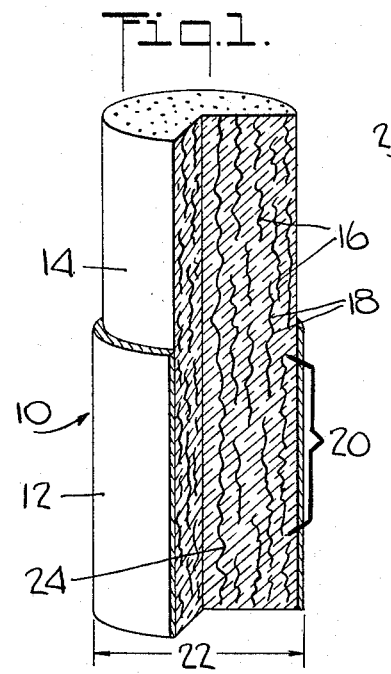
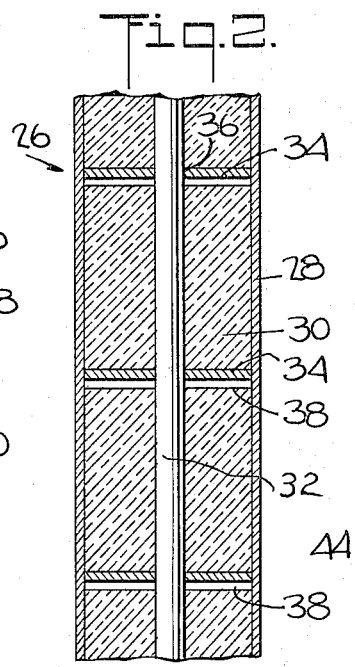
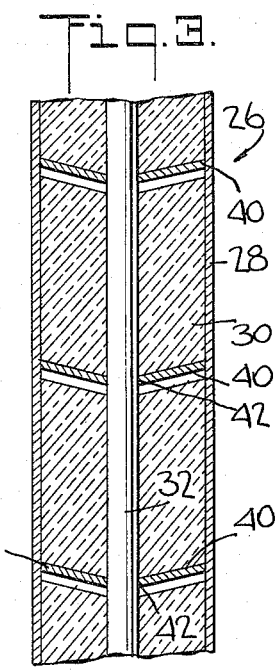
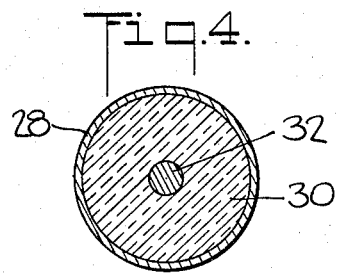
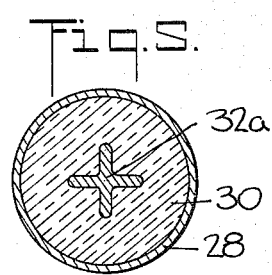
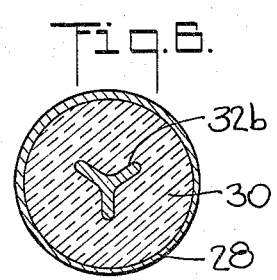
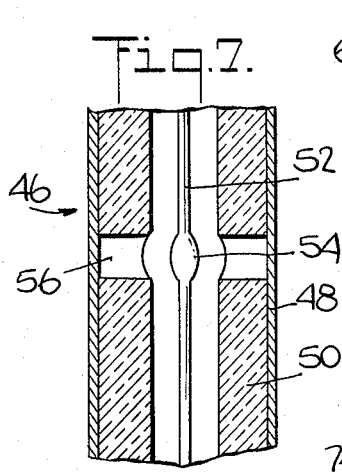
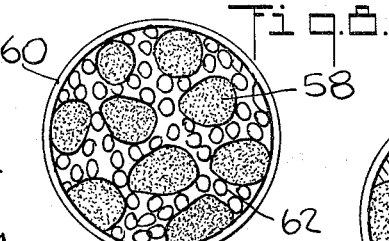
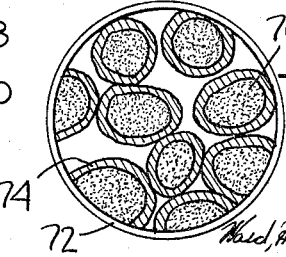
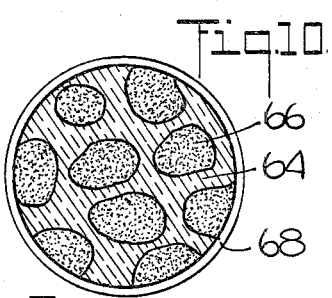
INVENTORS
WAYNE H. JENS
BY
ATTORNEYS

United States Patent Office 3,285,825
Patented Nov. 15, 1966

3,285,825
REINFORCED CERAMIC FUEL ELEMENTS
Wayne H. Jens, Grosse Pointe Park, Mich., assignor to Atomic Power Development Associates, Inc., Detroit, Mich., a corporation of New York
Filed Sept. 16, 1964, Ser. No. 396,943
23 Claims. (Cl. 176—68)

This invention relates to solid fuel elements for nuclear reactors, and more particularly to reinforcing means for such fuel elements.

In essence, a nuclear reactor controls or harnesses the energies released in fission by nuclear fuels and a coolant is circulated through the reactor to carry away the heat and limit the operating temperature. The nuclear fuel employed may be in a solid, liquid or slurry mixture state and it is concentrated in a reactor core.

This invention has to do with fuel elements in a solid form and is particularly adapted among other possible uses for use with ceramic fuels which are brittle and of low ductility. The use of ceramic fuels is particularly desirable due to their high potential burnup and high power density.

Heretofore the use of ceramic fuel elements has been substantially limited due to a major difficulty experienced therewith in the area of safety. Ceramic fuels tend to crack in a large number of places during irradiation, and if the fuel does not expand in a predictable manner, so that the over-all size of the core increases with an increase in power, it leads to reactor instability and a serious safety problem.

It is an aim of the present invention to provide a new and improved fuel element for a nuclear reactor which overcomes the difficulty experienced with the prior art fuel elements, which has good radiation stability, which can withstand high temperatures, which can withstand large temperature fluctuations, which has a large fuel expansion reactivity coefficient, which has a positive coefficient of thermal expansion, which has a reproducible coefficient of thermal expansion, and which will expand to increase the over-all size of the core with an increase in power.

Still another aim of this invention resides in the provision of a fuel element which has structural strength and rigidity, with which space may be provided longitudinally throughout the fuel element to allow for expansion, which has a good flux distribution within the reactor, which reduces the tendency of cracking to insignificance, and which reduces the possibility of the of the fuel pellets expanding towards the center of the core.

In addition, a feature of this invention resides in the provision of a new and improved fuel element for use in a nuclear reactor which may utilize low ductility and brittle ceramics and still obtain adequate expansion, which prevents high stresses from being built-up between the reinforcing agent and the ceramic fuel, which is safe and reliable in operation and which is easy and inexpensive to fabricate.

In essence, the present invention contemplates the provision of reinforcing ceramic material with a companionable metal, preferably the metal is of an elongated configuration and is disposed predominately in an axial direction with respect to the ceramic fuel element. If the fuel element has a pin-like, tubular or round configuration, it is preferable that the length of the ductile metal fibers be greater than the diameter of the fuel pin.

In one embodiment of the invention the metal fibers extend the entire length of the fuel pin and are held parallel to the longitudinal axis of the pin during fabrication. In another embodiment of the present invention, the metal fibers may be kinked in a wavy sort of fashion to eliminate the high stresses in the fibers due to the large expansion of the ceramic material. Thus, the metal fibers are so kinked and a selected number are used so that as the ceramic expands due to heating the kinked fibers in aggregate, while stretching longitudinally under the thermal expansion action of the ceramic material, nevertheless exert sufficient compression throughout the ceramic body so as to prevent the occurrence of cracks and the like. If the metal fibers extend the full length of the fuel element, the kinked fibers are held at both ends while the ceramic material is disposed thereabout so that when the ends are released the fibers apply a compacting force on the fuel element thereby preventing the occurrence of cracks during the heating thereof. It will be appreciated that the fuel element is subjected to a considerable fluctuation in temperature. During irradiation the temperature towards the middle of the fuel element may reach as high as about 3000° F. to about 4500° F. and then the element may drop to a temperature of about 600° F. when it is temporarily removed or partially removed from the reactor. This change of temperature sets up thermal stresses of high order, which result in cracks and separation of the fuel body, and hence, heretofore tended to limit the use of ceramics as a reactor fuel material. Applicant has substantially reduced this problem in a novel manner.

According to this invention ceramics which may be employed include $UO_2$, $PuO_2$, UC, PuC, UN, PuN, for example. It will be appreciated that the fibers must be compatible with the ceramic material being used and they must also be able to operate at reasonably high temperatures. Metal fibers which can readily operate at such high temperatures include Mo, Ta, Cb and W, for example. Additional metals which also may be employed include Fe, Ni, Cr and Zr. Additionally, alloys of these metals may also be utilized, if desired. Tungsten is particularly desirable because of its strength characteristics and because it has a melting point of about 7000° F.

According to another form of the present invention, a long metal string or rod is employed to which is fastened the ceramic fuel particles. By placing the metal string or rod at the center of the ceramic particles the expansion is amplified since the metal will operate at the maximum fuel temperature. This center metallic thread can be in the shape of a cross or a Y for purposes of adding stiffness thereto. The ceramic particles may be held to the central rod or thread by means of crimping the metal thread. Preferably a gap is provided between each ceramic fuel particle in order to insure the independent growth thereof. In another embodiment of this form of the present invention, a plurality of washers or trays are fastened to the center rod and are disposed at spaced apart locations one with respect to the other along the length of the fuel element. The trays may be held in longitudinal position by means of crimping the central rod. Pellets of ceramic material are placed on each tray and preferably a gap is provided between the trays in order to insure independent growth of each fuel pellet.

In still another embodiment of this form of the invention, the washers or trays that support the fuel may be of conical shape in order to prevent high thermal stresses. According to another embodiment of the invention each ceramic fuel pellet is mounted on a conical refractory metal washer or tray which is securely fastened to the clad tube. In the last mentioned embodiment the height of the conical washer would cause the pellets to move longitudinally in the tube. It will be appreciated that, particularly in fast reactors, the temperature coefficients of reactivity are small and the most prompt and important coefficients are associated with fuel movement. Thus, in the event that friction between the ceramic fuel pellets and the clad tube is sufficiently great to prevent movement of some of the pellets, this is of no significance as long as a sufficient number of pellets move within the tube. This is because the effect on reactivity is so great that an appreciable effect is achieved with only a few pellets moving.

A refractory metal is required for the rod material in order to achieve high power density in the fuel. For example, metal such as tungsten, molybdenum and niobium are desirable. Ceramics include such materials as an oxide, carbide, nitride, silicide, sulfide, for example. The fissionable materials include U-235, U-233, Pu-239 and fertile material like U-238 or Th-232 either separately or in mixtures or alloys thereof.

The invention in another form thereof comprises metallic material interposed within ceramic fuel material in a honeycomb-like manner for metallically integrating and strengthening the ceramic fuel material. In one embodiment the relatively large ceramic particles, with respect to the small niobium (Nb) particles, are interposed therebetween prior to sintering so that after sintering the niobium separates out in the grain boundaries as a bonding agent. Another embodiment of this form of the invention is to coat each ceramic particle with metal so that when the metal is heated it unites together as a honeycomb, thereby integrating and strengthening the ceramic fuel material.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as a basis for the designing of other structures for carrying out the several purposes of the invention. It is important, therefore, that the claims be regarded as including such equivalent constructions as do not depart from the spirit and scope of the invention. Specific embodiments of the invention have been chosen for purposes of illustration and description, and are shown in the accompanying drawings, forming a part of the specification, wherein:

FIG. 1 is a perspective view partially broken away of a fuel element showing a plurality of metallic fibers embedded within the ceramic fuel material in accordance with the concept of this invention;

FIG. 2 is a longitudinal sectional view of a fuel element showing another embodiment of this invention wherein a longitudinally disposed metal string or rod is centrally disposed within the ceramic fuel material and supports a plurality of transversely disposed trays;

FIG. 3 is a longitudinal sectional view of a fuel element similar to FIG. 2 except that the trays are of conical configuration;

FIG. 4 is a transverse sectional view of a fuel element showing a cylindrical rod extending longitudinally of said element;

FIG. 5 is a transverse sectional view of a fuel element similar to FIG. 4 except that the rod is of a cross-like configuration;

FIG. 6 is a transverse sectional view of a fuel element similar to FIGS. 4 and 5 except that the rod element is of a generally Y-shape;

FIG. 7 is a longitudinal sectional view of a fuel element showing a longitudinally extending rod-like member which has been crimped to retain the ceramic fuel material in spaced relationship;

FIG. 8 is a transverse cross-sectional view of another embodiment of this invention showing relatively large ceramic fuel particles having relatively small metallic particles interposed therebetween;

FIG. 9 is a transverse sectional view of a fuel element showing ceramic fuel particles having a metallic coating thereon; and FIG. 10 is a transverse sectional view of a fuel element of FIGS. 8 and 9 wherein the metallic portions have been united together to form a honeycomb structure about the ceramic particles.

In the embodiment of the invention illustrated in FIG. 1, the fuel element, designated generally at 10, is of a cylindrical configuration. It will be appreciated that the concept of this invention is equally applicable to the use of a tubular element or a plate-like element, for example, if desired. The fuel element 10 is provided with cladding 12 which is actually a relatively thin metallic container or jacket which prevents corrosion or erosion of the fuel element by the cooling fluid. It is also advantageous for purposes of sealing the fuel element in order to prevent the radioactive fission fragments from entering the cooling system. The cladding may be of zirconium, for example. The fuel element 10 further comprises particles of ceramic fuel material 14. Examples of ceramic material include $UO_2$, $PuO_2$, UC, PuC, UN, PuN. During irradiation of the fuel elements the ceramic fuel material tends to form a large number of cracks due to the low ductility thereof. If these cracks separate along the length of the fuel column and if the fuel is restricted by the cladding at the ends of the fuel column, then expansion toward the center of the core occurs. This leads to a positive prompt coefficient of reactivity which is undesirable from a stability standpoint. Applicant has overcome this problem in a novel manner.

The fuel element in accordance with this invention as shown in the embodiment of FIG. 1 further comprises a plurality of elongated reinforcing metallic fibers 16 embedded within and disposed predominantly in an axial direction with respect to the ceramic fuel material 14. These fibers are compatible with the ceramic material 14, and also they are able to operate at relatively high temperatures of the order of about 3000° F. to about 4500° F., for example. Metal fibers which can operate at such high temperatures include Mo, Ta, Cb and W. Also, the following metals could be used, Fe, Ni, Cr and Zr. It will be appreciated that alloys of these metals can likewise be employed. According to this invention the fibers 16 serve to reinforce the ceramic material 14 in order to preserve a reproducible and positive coefficient of thermal expansion and to prevent the fuel element from collapsing after a period of irradiation.

In fast reactors, the temperature coefficients of reactivity are small and the most prompt and important coefficients are associated with fuel movement. If the fuel does not expand in such a way as to increase the over-all size of the core with an increase in power, it could lead to reactor instability or a serious safety problem. Fuel elements constructed in accordance with the concept of this invention provide consistent, preselected fuel movement.

Still referring to FIG. 1, the fibers 16 may be provided with kinks 18 to produce a wavy sort of fiber. The purpose of the kinks is so that the reinforcing fibers 16 have substantially matching coefficients of thermal expansion with respect to the ceramic material 14 in order to prevent high stresses from being built up between the metal and the ceramic.

It is also desirable to provide fiber 16 of a length 20 which is longer than the diameter 22 of the fuel element 10 so that they will orient in the longitudinal direction during fabrication. This is particularly true if the element is being fabricated by means of vibration compaction.

In another embodiment of this invention, the metallic fiber 16 may extend the full length of the fuel element 10 as designated at 24 (FIG. 1). In this embodiment the fibers are held at both ends by means (not shown) during fabrication and the ceramic powders are vibrated and compacted between the fibers. Preferably, the fibers are kinked so that upon release of the ends they would apply a compressive force on the ceramic fuel material 14 to prevent the occurrence of cracks during heating of the fuel element.

In operation, the central portion of the fuel element is heated to a temeprature of between about 3000° F. and about 4500° F. This tends to expand the ceramic material. Thence, for operational purposes the reactor may be temporarily shut down or the fuel element may be temporarily removed from the reactor, whereby the fuel element is cooled until the center thereof drops to a temperature of about 600° F., for example. The ceramic fuel material contracts and gas pockets are formed at various points along the length thereof. The differential pressure between various gas pockets may be as much as 1000 p.s.i., a factor which causes considerable longitudinal forces. Also there is a possibility that the ceramic fuel elements could collapse due to the aforementioned voids filled with gas. The metallically integrating and strengthening of the ceramic fuel element according to the invention provides a reproducible composite coefficient of thermal expansion.

As best seen in FIGS. 2 and 3, a fuel element designated generally at 26 comprises an outer jacket or container cladding 28 and ceramic fuel particles 30. A central reinforcing member 32 is an elongated element. This member may assume numerous cross-sectional configurations such as a solid circular, a solid polygonal, a ring, a cross or a Y shape, for example. The ceramic material 30 may include the same types of material as described hereinbefore in connection wtih ceramic material 14 (FIG. 1), and the metallic reinforcing member 32 may be fabricated from the materials set forth in connection wtih fibers 16 (FIG. 1). Preferably the rod 32 is centrally disposed within the fuel element 26 since during operation the central portion of the fuel element 26 is at the maximum fuel temperature. The rod 32 extends substantially the total length of the fuel element and interposed at spaced intervals along the length thereof are a plurality of washers or trays 34 (FIG. 2). These trays are permanently affixed to the rod 32 as at 36. It will be appreciated that a space 38 is provided adjacent each tray 34 in order to allow the pellets or particles of ceramic fuel material carried by each tray to expand and contract according to their own requirements.

As best seen in FIG. 3, trays 40 are disposed at spaced intervals along the longitudinal reinforcing bar 32, and are fixedly attached thereto as at 42. The trays 40 are of conical configuration in order to prevent high thermal stresses.

In another embodiment of the invention, the conical shaped trays 40 may be fixedly secured to the cladding 28 as at 44 and the centrally disposed longitudinally extending rod 32 may be dispensed with. In this embodiment the height of the conical tray allows the pellets or particles of ceramic fuel material to move longitudinally within the cladding tube 28 during changes of temperature.

As best seen in FIGS. 4, 5 and 6, the rod 32 of FIGS. 2 and 3 may be of various cross-sectional configurations in order to increase the structural strength thereof. That is, FIG. 4 shows a rod 32 of circular-shaped transverse section, FIG. 5 shows a rod 32a having a cross-shaped transverse section, and FIG. 6 shows a rod 32b having a Y-shaped transverse section. The ceramic fuel particles 30 (FIGS. 2 and 3) each have a centrally disposed hole which is shaped correspondingly to the longitudinal reinforcing element 32 so that it may be threaded thereon as shown in FIGS. 2 and 3. To insure a short time constant and a rapid reactor response to a reactor power transient, the thickness of the rod 32 is made small and, therefore, a cross-section in the form of a cross is preferred.

According to another embodiment of this invention, as best seen in FIG. 7, a fuel element designated generally at 46 comprises cladding 48 and ceramic fuel particles or pellets 50. A wire or rod 52 is disposed centrally in the fuel element 46, and it is crimped as at 54 at spaced locations along the longitudinal length thereof. The rod 52 has a transverse section shaped like a cross similar to the rod 32a (FIG. 5), and the ceramic fuel particle 50 has a correspondingly shaped central boring so that it may be threaded thereon as shown in FIG. 7. In assembly a plurality of fuel particles 50 are disposed longitudinally along the wire 52, and at intervals along its length the wire 52 is crimped as at 54. A gap 56 is provided between each fuel particle 50 in order to provide space to insure that independent growth of each individual fuel particle or pellet is possible.

According to the invention, as seen in FIG. 8, ceramic fuel particles or pellets 58 are contained within the cladding 60, and a plurality of substantially smaller particles of metallic material or metallic compounds 62 are interposed between the ceramic fuel material 58. During fabrication the fuel element is heated to melt the metallic material 62 so that it becomes a honeycomb-like bonding agent for the ceramic material 58. Thus the metallic particles 62 become a bonding agent, as best seen in FIG. 10, for the ceramic material 66 contained in the clading 68 of the fuel element after completion of the fabrication.

Another embodiment of the invention is illustrated in FIG. 9 wherein a plurality of ceramic fuel pellets or particles 70 are disposed within cladding 72. Each ceramic particle 70 is coated with metal or a metal alloy 74 so that when the element is heated the metal unites together to form a honeycomb such as is shown in FIG. 10 whereas the metallic honeycomb is shown at 64 and the ceramic fuel particles are shown at 66. The ceramic particles 58 and 70 as illustrated in FIGS. 8 and 9 are of similar material as set forth hereinbefore in connection with the ceramic fuel material 14 shown in FIG. 1 and the metallic reinforcing material 62 and 74 in FIGS. 8 and 9 may be fabricated from the materials set forth for the metallic element 16 in the description of FIG. 1 hereinbefore.

It will thus be seen that the present invention does indeed provide an exceedingly attractive fuel element for a nuclear reactor having a reproducible and positive coefficient of thermal expansion.

Although particular embodiments of the invention are herein disclosed for purposes of explanation, further modifications thereof after study of this specification, will be apparent to those skilled in the art to which the invention pertains. Reference should accordingly be had to the appended claims in determining the scope of the invention.

What is claimed and desired to be secured by Letters Patent is:

1. A fuel element for a nuclear reactor comprising ceramic fuel material, a plurality of elongated reinforcing metallic fibers embedded within and disposed predominantly in an axial direction with respect to said ceramic fuel material whereby a substantially reproducible and positive coefficient of thermal expansion is obtained.

2. A fuel element for a nuclear reactor comprising ceramic fuel material, a plurality of elongated reinforcing metallic fibers embedded within and disposed predominantly in a longitudinal direction with respect to said ceramic fuel material, the length of said metallic fibers being greater than the longest distance across a transverse section of said fuel element, whereby a substantially reproducible and positive coefficient of thermal expansion is obtained.

3. A fuel element for a nuclear reactor comprising ceramic fuel material, a plurality of reinforcing metallic fibers embedded within said ceramic material, said metallic fibers being of a length greater than the length of said fuel element, whereby said fuel element is reinforced in the axial direction.

4. A fuel element for a nuclear reactor comprising ceramic fuel material, a plurality of resilient reinforcing metallic fibers embedded within and disposed in spaced relationship one with respect to the other, said metallic fibers being of a length greater than the length of said fuel element, and said fibers being adapted to exert a longitudinal compressive force on said fuel element.

5. A fuel element for a nuclear reactor comprising ceramic fuel material, a plurality of elongated reinforcing metallic fibers embedded within and disposed predominantly in an axial direction with respect to said ceramic fuel material, said metallic fibers having a thermal coefficient of expansion substantially equal to the thermal coefficient of expansion of said ceramic fuel material, whereby a substantially reproducible and positive coefficient of thermal expansion is obtained in said fuel element.

6. A fuel element for a nuclear reactor comprising ceramic fuel material, a plurality of kinked elongated reinforcing metallic fibers embedded within and disposed predominantly in an axial direction with respect to said ceramic fuel material whereby the thermal coefficient of expansion of the metallic fibers is substantially equal to the thermal coefficient of expansion of the ceramic fuel material.

7. A fuel element for a nuclear reactor comprising ceramic material, a plurality of kinked reinforcing metallic fibers embedded within said ceramic fuel material, the length of said metallic fibers being substantially equal to the length of said fuel element and said fibers being disposed predominantly in an axial direction with respect to said fuel element, whereby said metallic fibers provide a compacting reinforcing force acting on the ceramic fuel material thereby preventing the occurrence of cracks during heating of the fuel element.

8. A fuel element for a nuclear reactor comprising ceramic fuel material, a plurality of elongated reinforcing metallic fibers embedded within and disposed in a longitudinal direction with respect to said fuel element for metallically integrating and strengthening said ceramic fuel material, wherein the ceramic fuel material is selected from the group consisting of an oxide, a carbide, a nitride, a silicide and a sulfide, whereby a substantially reproducible and positive coefficient of thermal expansion is obtained.

9. A fuel element for a nuclear reactor comprising ceramic fuel material, a plurality of elongated reinforcing metallic fibers embedded within and disposed in a longitudinal direction with respect to said fuel element for metallically integrating and strengthening said ceramic fuel material, wherein said ceramic fuel material is selected from the group consisting of an oxide and a carbide, whereby a substantially reproducible and positive coefficient of thermal expansion is obtained.

10. A fuel element for a nuclear reactor comprising ceramic fuel material, a plurality of elongated reinforcing metallic fibers embedded within and disposed in a longitudinal direction with respect to said fuel element for metallically integrating and strengthening said ceramic fuel material, wherein said metallic material is selected from the group consisting of molybdenum, cobalt, tungsten, iron, nickel, chromium, zirconium, niobium, tantalum, titanium, whereby a substantially reproducible and positive coefficient of thermal expansion is obtained.

11. A fuel element for a nuclear reactor comprising ceramic fuel material, a plurality of elongated reinforcing metallic fibers embedded within and disposed in a longitudinal direction with respect to said fuel element for metallically integrating and strengthening said ceramic fuel material, wherein said metallic material is selected from the group consisting of an alloy of molybdenum, cobalt, tungsten, iron, nickel, chromium, zirconium niobium, tantalum, titanium, whereby a substantially reproducible and positive coefficient of thermal expansion is obtained.

12. A fuel element for a nuclear reactor comprising ceramic fuel material, a plurality of elongated reinforcing metallic fibers embedded within and disposed in a longitudinal direction with respect to said fuel elements for metallically integrating and strengthening said ceramic fuel material, wherein said metallic material is selected from the group consitsing of molybdenum, tungsten, niobium, and alloys thereof, whereby a substantially reproducible and positive coefficient of thermal expansion is obtained.

13. A fuel element for a nuclear reactor comprising ceramic fuel material, a metallic rod for integrating and strengthening said ceramic fuel material, said metallic rod being disposed predominantly in an axial direction with respect to said ceramic fuel material whereby said fuel element is reinforced in the axial direction.

14. A fuel element for a nuclear reactor comprising ceramic fuel material, a metallic rod for integrating and strengthening said ceramic fuel material, said metallic rod being centrally disposed and predominantly extending in an axial direction with respect to said ceramic fuel material whereby said fuel element is reinforced in the axial direction.

15. A fuel element for a nuclear reactor comprising ceramic fuel particles, a metallic bar for integrating and strengthening said ceramic fuel material, said metallic bar being disposed centrally and predominantly in an axial direction with respect to said ceramic fuel material, a plurality of transversely extending trays fixedly connected to said bar at longitudinally spaced locations, whereby each of said trays is adapted to support a portion of said ceramic fuel particles.

16. A fuel element for a nuclear reactor comprising ceramical fuel material, a metallic rod for integrating and strengthening said ceramic fuel materials, said metallic rod being centrally disposed and extending substantially in an axial direction with respect to said ceramic fuel material, a plurality of conically shaped trays attached to said rod at longitudinally spaced locations one with respect to the other, whereby a portion of said ceramic fuel particles are supported by each of said trays.

17. An elongated fuel element for a nuclear reactor comprising a plurality of ceramic fuel pellets, a metallic rod for integrating and strengthening said ceramic fuel pellets in a longitudinal direction with respect to said fuel element, said metallic rod having a selected cross-sectional contour and said ceramic fuel pellets being provided with a centrally disposed opening of a mating contour with respect to said cross-sectional contour of said metallic rod, whereby said pellets are longitudinally disposed on said metallic rod, and means for axially positioning said pellets upon said rod whereby said fuel element is reinforced in the axial direction.

18. A fuel element according to claim 17 wherein said means for axially positioning said pellets on said rod comprises crimping said rod as a plurality of longitudinally spaced locations.

19. A fuel element for a nuclear reactor comprising ceramic fuel material, a metallic rod for integrating and strengthening said ceramic fuel material, said metallic rod having a substantially cross configuration as viewed in a transverse section thereof, said metallic rod being disposed predominantly in an axial direction with respect to said ceramic fuel material whereby a substantially reproducible and positive coefficient of thermal expansion is obtained.

20. A fuel element for a nuclear reactor comprising ceramic fuel pellets, a metallic rod for integrating and strengthening said ceramic fuel pellets, said metallic rod having a substantially Y-shaped configuration as viewed in a transverse sectional view thereof, said metallic rod being centrally disposed and extending substantially longitudinally of said fuel element, whereby a substantially reproducible and positive coefficient of thermal expansion is obtained.

21. A fuel element for a nuclear reactor comprising ceramic fuel pellets, wherein the ceramic fuel material is selected from the group consisting of an oxide, a carbide, a nitride, a silicide and a sulfide, a metallic bar for integrating and strengthening said ceramic fuel pellets, wherein said metallic material is selected from the group consisting of molybdenum, cobalt, tungsten, iron, nickel, chromium, zirconium, niobium, tantalum, titanium, said metallic bar being centrally disposed and extending substantially longitudinally of said fuel element, means for positioning said pellets along said metallic bar in longitudinally spaced position, whereby a substantially reproducible and positive coefficient of thermal expansion is obtained.

22. A fuel element for a nuclear reactor comprising a plurality of particles of ceramic fuel material of a first particle size, a plurality of metallic material of a second particle size intermixed with said ceramic fuel material, said second particle size being substantially smaller than said first particle size whereby upon fabrication said metallic particles form a honeycomb-like bonding agent for said ceramic fuel material and thereby provide an integrated and strengthened ceramic fuel element.

23. A fuel element for a nuclear reactor comprising a plurality of ceramic fuel particles, metallic material coating for each of said ceramic particles whereby upon fabrication said metallic particles form a honeycomb-like structure thereby integrating and strengthening said ceramic fuel material whereby a substantially reproducible and positive coefficient of thermal expansion is obtained.

References Cited by the Examiner
UNITED STATES PATENTS

| | | | |
|---|---|---|---|
| 2,805,473 | 9/1957 | Handwerk et al. | 176—89 X |
| 3,088,892 | 5/1963 | Cain et al. | 176—69 |
| 3,177,578 | 4/1965 | Barr | 176—89 X |

OTHER REFERENCES

A.E.C. Bulletin ANL–5717, Mar. 31, 1957, pp. 10–11.

A.E.C. Bulletin TID–7530 (Pt. 1), April 1957, pp. 118–131.

Reactor Handbook, vol. 1, 1960, p. 502.

BENJAMIN R. PADGETT, *Primary Examiner.*

M. J. SCOLNICK, *Assistant Examiner.*